Patented July 5, 1938

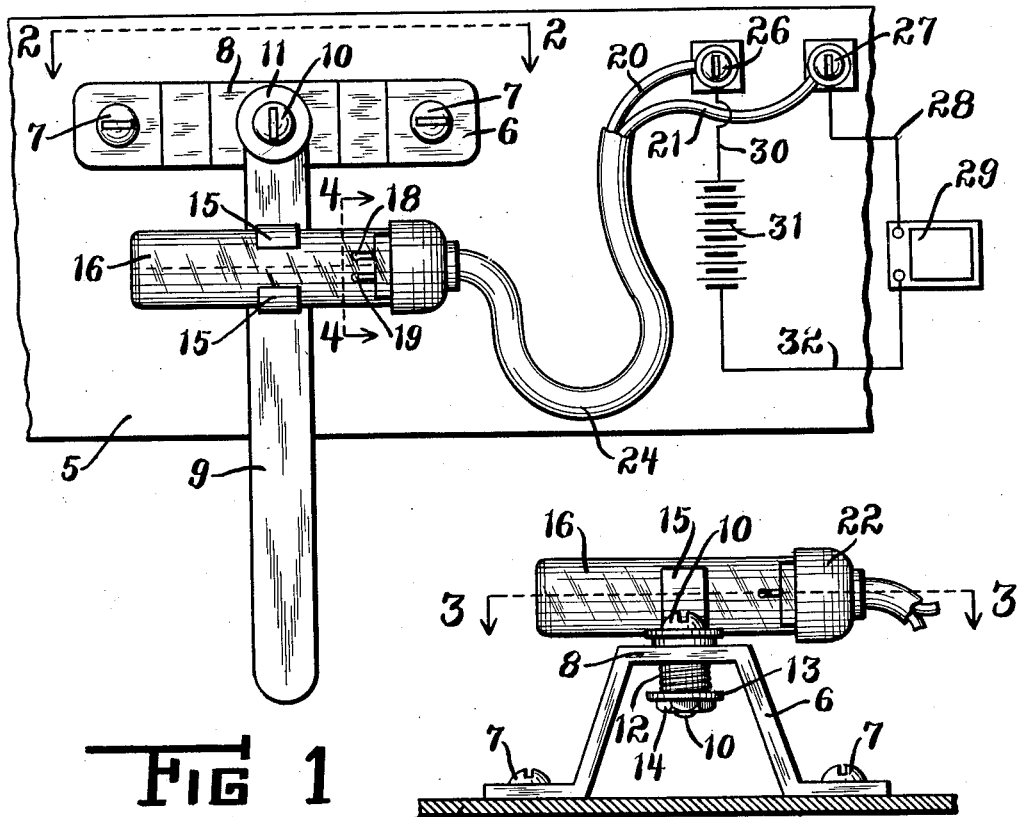

2,122,921

UNITED STATES PATENT OFFICE 2,122,921

ALARM DEVICE

Donald Sands, Akron, Ohio

Application April 25, 1934, Serial No. 722,325

2 Claims. (Cl. 200—52)

This invention relates to improvements in circuit closing devices and while adapted for use generally wherever it may be advantageously employed, the invention is particularly intended for use in alarm apparatus and can be employed to advantage in protecting automotive vehicles and the contents thereof against molestation by unauthorized persons.

Objects of the invention are to provide an electrically operated alarm of simple, inexpensive construction which may be installed in an automobile or other movable article and which may be easily and conveniently regulated to sound an alarm when the article is subjected to a slight movement.

A further object is to provide an electrically operated circuit closing device which may be interposed in an alarm circuit and which may be attached to an automobile or other object and easily and quickly regulated to maintain an open circuit regardless of the angle at which the article is positioned and which will close the alarm circuit when the article is moved or vibrated.

Other objects are to provide an improved circuit closing device which may be quickly and conveniently installed on an automobile or other vehicle and which will include a lever mounted mercury switch which can be set in an open position by regulating the lever and which is provided with additional means for regulating the switch to respond to different degrees of movement and which can be conveniently swung to an inoperative position when not in use.

With the above and other objects and advantages in view, the invention will be hereinafter described with reference to the accompanying drawing in which there is shown an illustrative adaptation thereof, it being understood that the invention is not confined to the particular form shown and that changes and modifications may be made which come within the spirit of the invention as set forth in the appended claims.

In the drawing:

Figure 1 is an elevational view showing a portion of an automobile instrument board having a circuit closing device constructed in accordance with this invention operatively installed thereon and illustrating in diagrammatic form an automobile alarm circuit.

Figure 2 is a top plan view of same, showing a portion of the instrument board in horizontal section and taken as indicated by the lines 2—2 of Figure 1.

Figure 3 is a central, longitudinal, sectional view of the mercury switch employed in reducing the invention to practice, the same being taken as indicated by the lines 3—3 of Figure 2.

Figure 4 is a cross sectional view of same taken as indicated by the lines 4—4 of Figure 1.

Proceeding now to a detailed description of the invention with reference to the particular adaptation thereof disclosed in the drawing, the numeral 5 is used to denote an automobile instrument board and the numeral 6 a bracket which may be of any suitable construction and which is secured to the instrument board 5 by means of the screws 7 or other suitable means. As shown in the drawing, the bracket 6 is secured to the instrument board 5 in a horizontal position. The central portion 8 of the bracket 6 is positioned outwardly in spaced relation to the instrument board 5.

The numeral 9 denotes a lever which has one end thereof fulcrumed on the central portion 8 of the bracket 6. Both the lever 9 and the central portion 8 are provided with alined apertures (not shown) for receiving a bolt 10 which is operatively positioned therethrough with the washer 11 positioned between the head of the bolt 10 and the lever 9. The bolt 10 projects beyond the rear face of the portion 8 of the bracket 6 and a spring 12 is positioned thereon.

The numeral 13 denotes a washer which is positioned on the bolt 10 to bear against the end of the spring 12. The numeral 14 denotes a nut which is threaded on the inwardly projecting end of the bolt 10 to force the washer 14 against the spring 12 to exert a braking influence which will retard the free movement of the lever 9 and hold the same in a set position. The lever 9 is provided with spring clips 15 which are suitably secured thereto adjacent the fulcrumed end thereof. The spring clips 15 are adapted to receive and detachably hold the tube 16 which will be hereinafter described.

The circuit closing element disclosed in the drawing comprises a cylindrical bottle 16 which is composed of glass or any suitable material and which is provided at the open end thereof with a suitable closure member 17 in the form of a cylindrical plug.

The numerals 18 and 19 denote terminals which are mounted in the closure member 17 and which project inwardly therefrom in spaced relation to each other. The closure member 17 is also provided with means for securing a conductor wire 20 to the terminal 18 and a conductor wire 21 to the terminal 19.

A suitable cap 22 is positioned over the plugged end of the bottle 16. The cap 22 is provided with an axial opening 23 through which the conductor wires 20 and 21 extend. A suitable sheath 24 may be employed to cover the conductor wires 20 and 21. The bottle 16 contains a quantity of mercury 25 or other suitable fluid circuit closing element. The conductor wire 20 leads to a suitable terminal post 26 and the conductor wire 21 to a similar post 27. The post 27 is connected by means of a conductor wire 28 to an electrically operated automobile horn or other electrically operated alarm device 29 and the post 26 is connected by the conductor wire 30 to a battery 31. The other end of the battery 31 being operatively connected by means of a conductor wire 32 to the electrically operated alarm device 29.

The clips 15 on the lever 9 are adapted to receive the bottle 16 and detachably, yet firmly hold the same in position on the lever 9. The conductor wires 20 and 21 are formed of a length to provide sufficient slack so that the lever 9 may be freely moved without disturbing the relative position of the bottle 16. When not in use, the lever 9 is swung to a horizontal position with the closed end of the bottle 16 in a downward position.

In using the alarm device herein described on an automobile, the lever 9 is swung to an upright position and the bottle 16 is rotated in the clips 15 so that one of the electrodes 19 is positioned in the mercury 25 and the other electrode 18 is positioned in close, spaced relation thereabove. It will be seen that with the automobile in an inclined position that the lever 9 may be regulated or the bottle 16 turned in the clips 15 to provide a normally open electric circuit. As the electrode is positioned slightly above the level of the mercury 25, a slight movement of the automobile will cause a movement of the mercury 25 which will bring the same in contact with the electrode 18 and close the circuit sounding the alarm 29.

Having thus illustrated my invention and described the same in detail, what I claim as new and desire to secure by Letters Patent is:—

1. In an alarm device for a vehicle, a closed cylindrical container, holding means therefor, said holding means movable in a plane disposed transversely of the vehicle, said container rotatable in said holding means, a liquid of high electric conductivity partly filling said container, electrical terminals projecting into said container for contact with said liquid, said terminals positioned on diametrically opposite sides of the axis of said container, said holding means selectively movable to set said container in a position in which said terminals will not be connected by said liquid, spring operated means for restraining the movement of said holding member, said terminals adapted to be operatively interposed in an alarm circuit, said liquid adapted to connect said terminals and close said circuit when the container is subjected to a slight movement.

2. In a device of the character described, a lever, means to secure said lever in a depending position on a vehicle for movement in a plane disposed transversely thereof; a closed tube adjustably secured to said lever at a point intermediate the length thereof and extending transversely thereof, means to yieldably hold the lever in a set position; an electrically conductive liquid partly filling said tube, spaced, parallel, electrical terminals projecting into one end of said tube for contact with said liquid, said tube being rotatable in said clip on its axis for adjusting the position of said terminals relative to said liquid.

DONALD SANDS.